US010494215B2

(12) United States Patent
Galea

(10) Patent No.: US 10,494,215 B2
(45) **Date of Patent: *Dec. 3, 2019**

(54) METHOD AND APPARATUS FOR FABRICATING STRETCH FILM ROLLS

(71) Applicant: Anthony Galea, Markham (CA)

(72) Inventor: Anthony Galea, Markham (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/827,467

(22) Filed: Nov. 30, 2017

(65) Prior Publication Data

US 2018/0079613 A1 Mar. 22, 2018

Related U.S. Application Data

(63) Continuation of application No. 14/743,468, filed on Jun. 18, 2015, which is a continuation-in-part of application No. 13/755,532, filed on Jan. 31, 2013, now abandoned.

(51) Int. Cl.

| | |
|---|---|
| ***B32B 3/00*** | (2006.01) |
| ***B65H 18/10*** | (2006.01) |
| ***B65H 35/02*** | (2006.01) |
| ***B26D 1/06*** | (2006.01) |
| ***B26D 3/10*** | (2006.01) |
| *B26D 1/00* | (2006.01) |

(52) U.S. Cl.

CPC ............. *B65H 18/10* (2013.01); *B26D 1/065* (2013.01); *B26D 3/10* (2013.01); *B65H 35/02* (2013.01); *B26D 2001/0033* (2013.01); *B65H 2301/4148* (2013.01); *B65H 2701/1944* (2013.01); *Y10T 83/2196* (2015.04)

(58) Field of Classification Search

CPC ............................... B65H 18/10; B65H 35/02; B65H 2701/1944; B65H 2301/41487; B26D 1/065; B26D 3/10; B26D 2001/0033

See application file for complete search history.

(56) References Cited

U.S. PATENT DOCUMENTS

2003/0189118 A1* 10/2003 Smith .................... B65H 18/28 242/160.4

* cited by examiner

*Primary Examiner* — Elizabeth E Mulvaney

(57) ABSTRACT

A stretch film roll comprises a wound stretch film web section having longitudinal edges that are non-linear, where the stretch film roll comprises a cylindrical central portion and tapered end portions.

11 Claims, 4 Drawing Sheets

METHOD AND APPARATUS FOR FABRICATING STRETCH FILM ROLLS

CROSS-REFERENCE TO RELATED APPLICATIONS

This application is a continuation of U.S. patent application Ser. No. 14/743,468 filed on Jun. 18, 2015, which is a continuation-in-part of U.S. patent application Ser. No. 13/755,532 filed on Jan. 31, 2013, the contents of which are incorporated herein by reference in their entireties.

FIELD OF THE INVENTION

The present invention relates generally to stretch film and in particular, to a method and apparatus for fabricating stretch film rolls.

BACKGROUND OF THE INVENTION

Stretch film is widely used for wrapping and securing pallet loads for shipping. This is due to the fact that stretch film exhibits a "memory", or a tendency to shrink, upon stretching. For example, stretch film that is stretched by an amount of 10% will shrink nearly 10% of its stretched length. This "memory" assists in securing wrapped palletized articles together under compression.

Stretch film is fabricated in the form of stretch film rolls. Each stretch film roll may be used to manually wrap a pallet load, or may be loaded into an automated wrapping machine.

An issue with conventional stretch film rolls is that the stretch film wound within the roll can become damaged if the stretch film roll is dropped or otherwise mishandled. For example, dropping the stretch film roll on its edge can result in tearing of the stretch film during wrapping of a pallet load.

One approach to avoiding such tearing involves folding the longitudinal edges of the stretch film prior to winding, so as to provide a stretch film having reinforced longitudinal edges within the stretch film roll. Methods of folding the longitudinal edges of stretch film prior to winding have been described. For example, U.S. Pat. No. 5,520,872 to Scherer discloses a strip of stretch-wrap material having flat, double thickness hems at opposite margins thereof. The hemmed strip is formed on an apparatus including a first roller having a width less than the width of stock material, whereby opposite margins of the stock material project beyond opposite ends of the roller, and a second roller for guiding the strip at an acute angle from the first roller for causing opposite marginal portions to fold. The strip is maintained under tension by a take-up roller or other means, and guide bars are provided for further folding the marginal portions past 90 degree angles so that they continue to be folded inwardly against the main body of the strip.

Another approach to avoiding tearing involves oscillating the stretch film during winding, so as to prevent formation of hard edges within the stretch film roll. Methods of oscillating stretch film during winding have been described. For example, U.S. Pat. No. 5,967,437 to Martin-Cocher et al. discloses a method of manufacturing rolls of pre-stretched film that comprises importing oscillation to the film with a component perpendicular to the film axis. During pre-stretching and winding of the film on a take-up roll, a feed roll, namely a spool from which the stretchable film for stretching is taken, is caused to oscillate, and/or the take-up core is caused to oscillate.

Improvements are generally desired. It is therefore an object at least to provide a novel method and apparatus for fabricating stretch film rolls.

SUMMARY OF THE INVENTION

In one aspect, there is provided an apparatus for fabricating stretch film rolls, comprising: a first plurality of cutting blades configured to be oscillated; a second plurality of cutting blades configured to be oscillated independently of the first plurality of cutting blades, the first and second pluralities of cutting blades being configured for cutting a stretch film web into one or more stretch film web sections each having at least one non-linear longitudinal edge; and a driven winding shaft for winding the one or more stretch film web sections.

Each stretch film web section may have a variable width. The first and second pluralities of cutting blades may be configured to be oscillated in an asymmetric manner. Each stretch film web section may have a constant width. The first and second pluralities of cutting blades may be configured to be oscillated in a symmetric manner.

The first plurality of cutting blades may be configured to be oscillated by a first linear oscillating device, and the second plurality of cutting blades may be configured to be oscillated by a second linear oscillating device. One or both of the first linear oscillating device and the second linear oscillating device may be selected from the group consisting of: a servomotor; an electric motor; and a conventional electric motor configured to drive an eccentric cam.

Each plurality of cutting blades may be configured to be oscillated along an axis that is generally orthogonal to a direction of travel of the stretch film web. The first and second pluralities of cutting blades may be configured to be oscillated along the same axis.

At least one plurality of cutting blades may be configured to be oscillated over a fixed distance. At least one plurality of cutting blades may be configured to be oscillated over a variable distance. At least one plurality of cutting blades may be configured to be oscillated at a fixed frequency. At least one plurality of cutting blades may be configured to be oscillated at a variable frequency.

The apparatus may further comprise a roller positioned adjacent the winding shaft, a wound surface of the one or more stretch film web sections being in contact with a surface of the roller. The roller may be configured as a driven roller. The roller may be configured as an idler roller.

In another aspect, there is provided a method for fabricating stretch film rolls, comprising: providing a stretch film web; cutting the stretch film web into one or more stretch film web sections using a first plurality of cutting blades configured to be oscillated and a second plurality of cutting blades configured to be oscillated independently of the first plurality of cutting blades, the one or more stretch film web sections each having at least one non-linear longitudinal edge; and winding the one or more stretch film web sections.

The winding may further comprise winding each stretch film web section onto a core.

In another aspect, there is provided a method for cutting stretch film during fabrication of stretch film rolls, comprising: cutting a stretch film web using a first plurality of cutting blades and a second plurality of cutting blades into one or more stretch film web sections each having at least one non-linear longitudinal edge, the cutting blades being oscillated during said cutting, the second plurality of cutting blades being configured to be oscillated independently of the first plurality of cutting blades.

In another aspect, there is provided a stretch film roll, comprising: a wound stretch film web section having longitudinal edges that are non-linear, the stretch film roll comprising: a cylindrical central portion; and tapered end portions.

The stretch film web section may have a variable width. The stretch film web section may have a constant width.

The non-linear longitudinal edges may comprise: a first longitudinal edge formed by a first cutting blade that is oscillated; and a second longitudinal edge formed by a second cutting blade that is oscillated.

The second cutting blade may be oscillated independently of the first cutting blade. The first cutting blade is oscillated in an asymmetric manner relative to the second cutting blade.

Each of the cutting blades may be oscillated along an axis that is generally orthogonal to a direction of travel of the stretch film web section during cutting. The first and second cutting blades may be oscillated along the same axis.

At least one of the first cutting blade and the second cutting blade may be oscillated over a fixed distance. At least one of the first cutting blade and the second cutting blade may be oscillated over a variable distance. At least one of the first cutting blade and the second cutting blade may be oscillated at a fixed frequency. At least one of the first cutting blade and the second cutting blade may be oscillated at a variable frequency.

BRIEF DESCRIPTION OF THE DRAWINGS

Embodiments will now be described more fully with reference to the accompanying drawings in which.

DETAILED DESCRIPTION OF THE EMBODIMENTS

Figure 1:
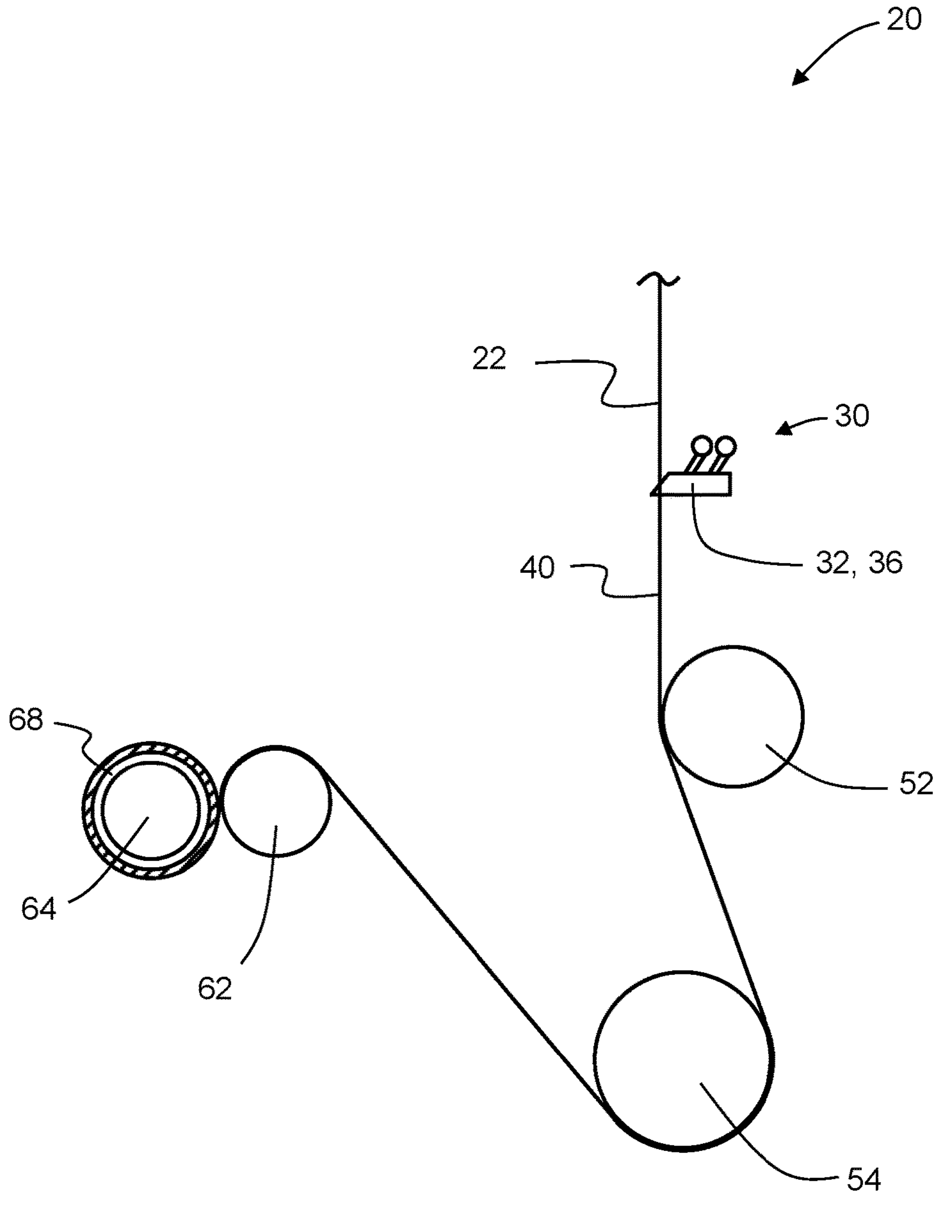
FIG. 1 is a schematic side view of a portion of an apparatus for fabricating stretch film rolls, during use.
Figure 2:
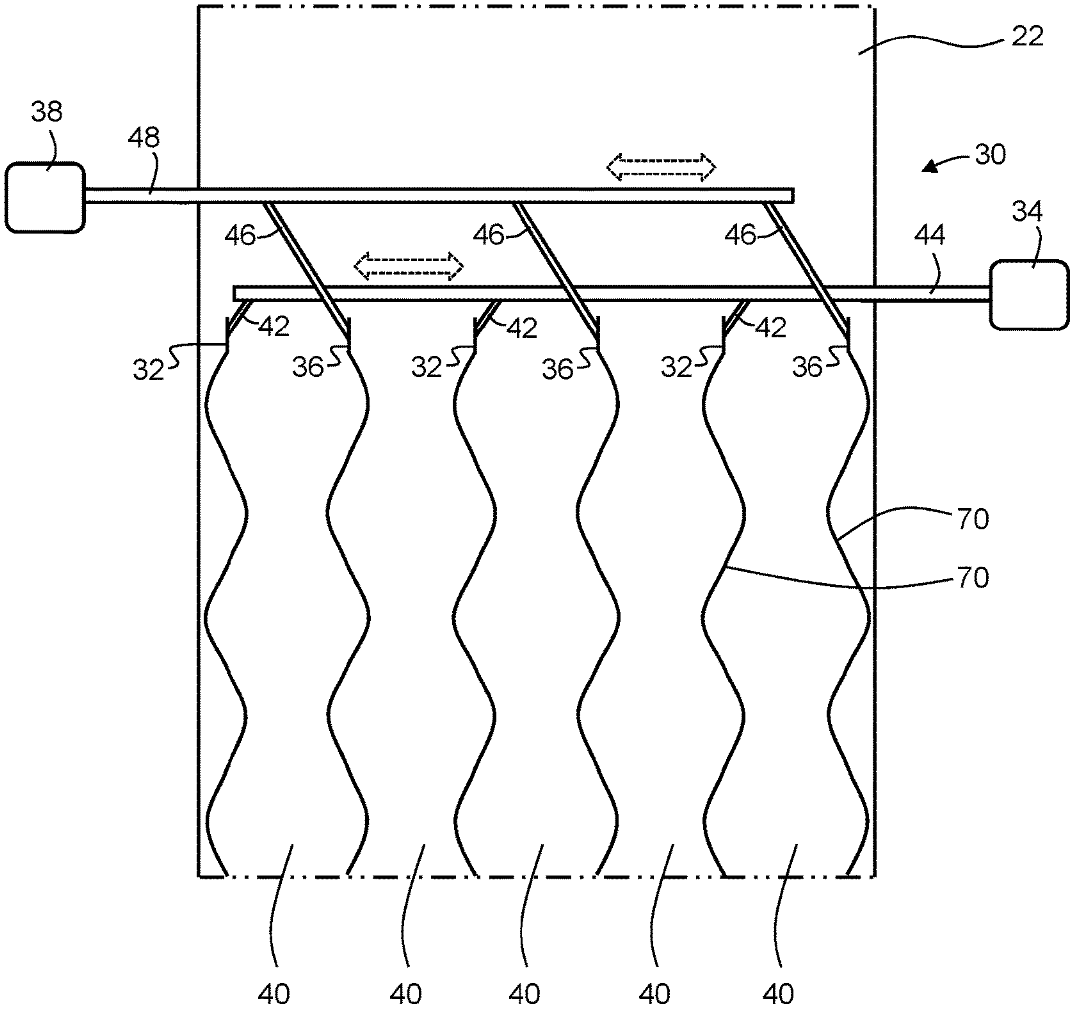
FIG. 2 is a schematic front view of a cutting station forming part of the apparatus of FIG. 1, during use.

Turning now to FIGS. 1 and 2, a portion of an apparatus for fabricating stretch film rolls is shown, and is generally indicated by reference numeral 20. Apparatus 20 comprises an extruder (not shown) that is configured to dispense a continuous sheet of plastic film onto a surface of a rotating cast roller (not shown) so as to form a stretch film web 22. Apparatus 20 also comprises a set of rollers (not shown) configured to receive the stretch film web 22 from the cast roller.

Apparatus 20 further comprises a cutting station 30 that is positioned downstream from the set of rollers. The cutting station 30 comprises a first plurality of cutting blades 32 coupled to a first linear oscillating device 34, and a second plurality of cutting blades 36 coupled to a second linear oscillating device 38. The first linear oscillating device 34 is configured to oscillate the first plurality of cutting blades 32 along an oscillation axis that is generally orthogonal to the direction of travel of the stretch film web 22. Similarly, the second linear oscillating device 38 is configured to oscillate the second plurality of cutting blades 36 along an oscillation axis that is generally orthogonal to the direction of travel of the stretch film web 22. In turn, the cutting blades 32 and 36 are configured to cut, or "slit", the moving stretch film web 22 into a plurality of stretch film web sections 40, with each section 40 having a variable width. In the embodiment shown, both pluralities of cutting blades 32 and 36 are oscillated along a common oscillation axis 41.

In this embodiment, each cutting blade 32 is mechanically coupled to the first linear oscillating device 34 via a linkage arm 42 connected to a first push rod 44 that is configured to be extended from and retracted toward the first linear oscillating device 34 in an oscillating manner; similarly, each cutting blade 36 is mechanically coupled to the second linear oscillating device 38 via a linkage arm 46 connected to a second push rod 48 that is configured to be extended from and retracted toward the second linear oscillating device 38 in an oscillating manner.

Each of the first and second linear oscillating devices 34 and 38 is configured to be independently operated via suitable control structure (not shown). The control structure may comprise any of analog controls and digital processing structure, for example, and may be a single control structure configured to operate both linear oscillating devices 34 and 38 independently, or may be two separate control structure units in communication with each other and each independently operating a respective linear oscillating device 34 and 38. In this embodiment, each of the first and second linear oscillating devices 34 and 38 is a servomotor or an electric motor.

In the embodiment shown, the first and second linear oscillating devices 34 and 38 are configured to oscillate the first and second pluralities of cutting blades 32 and 36, respectively, such that each of the first and second pluralities of cutting blades 32 and 36 is oscillated at the same fixed frequency and over the same fixed distance along the oscillation axis. In this embodiment, the fixed frequency is a frequency in the range from 0 cycles per minute to about 200 cycles per minute, and the fixed distance, and namely the distance travelled during one cycle, is a distance in the range from 0 inches to about 4 inches, and preferably is a distance in the range from about 0.5 inches to about 1.5 inches.

Apparatus 20 also comprises a first intermediate roller 52 that is configured to receive the stretch film web sections 40 downstream from the cutting station 30, and a second intermediate roller 54 that is configured to receive the stretch film web sections 40 from the first intermediate roller 52. In this embodiment, the first intermediate roller 52 and the second intermediate roller 54 are idler rollers.

Apparatus 20 further comprises a roller 62 that is configured to receive the stretch film web sections 40 from the second intermediate roller 54. Apparatus 20 further comprises a winding shaft 64 positioned adjacent the roller 62 and supporting a plurality of cores 68. The winding shaft 64, with the cores 68 supported thereon, is configured to receive the stretch film web sections 40 from the roller 62 for winding each stretch film web section 40 onto a respective core 68, so as to form a plurality of stretch film rolls. An assembly (not shown) is provided for rotatably driving the winding shaft 64. The surface of the stretch film wound onto the cores 68 is in contact with the surface of the roller 62, so as to prevent entrapment of air between layers of the stretch film during winding. In this embodiment, the roller 62 is configured as an idler roller.

During operation, the extruder dispenses a continuous sheet of plastic film onto the surface of the rotating cast roller to form the stretch film web 22, which is then received by the set of rollers. From the set of rollers, the stretch film web 22 travels downstream to the cutting station 30, where it is engaged by the plurality of cutting blades 32 and 36 and cut into a plurality of stretch film web sections 40. The cutting blades 32 and 36 are being oscillated along the oscillation axis. As a result of this oscillation, each stretch film web section 40 has a variable width, and has longitudinal edges 70 that are defined by cutting lines which are generally non-linear along the length of the stretch film web section 40, as shown schematically in FIG. 2.

Downstream from the cutting station 30, the stretch film web sections 40 are received by the first intermediate roller 52, and in turn by the second intermediate roller 54. From the intermediate roller 54, the stretch film web sections 40 are received by the roller 62, and in turn by the winding shaft 64 supporting the plurality of cores 68, at which each stretch film web section 40 is wound onto a respective core 68 so as to form a plurality of stretch film rolls.

Figure 3:
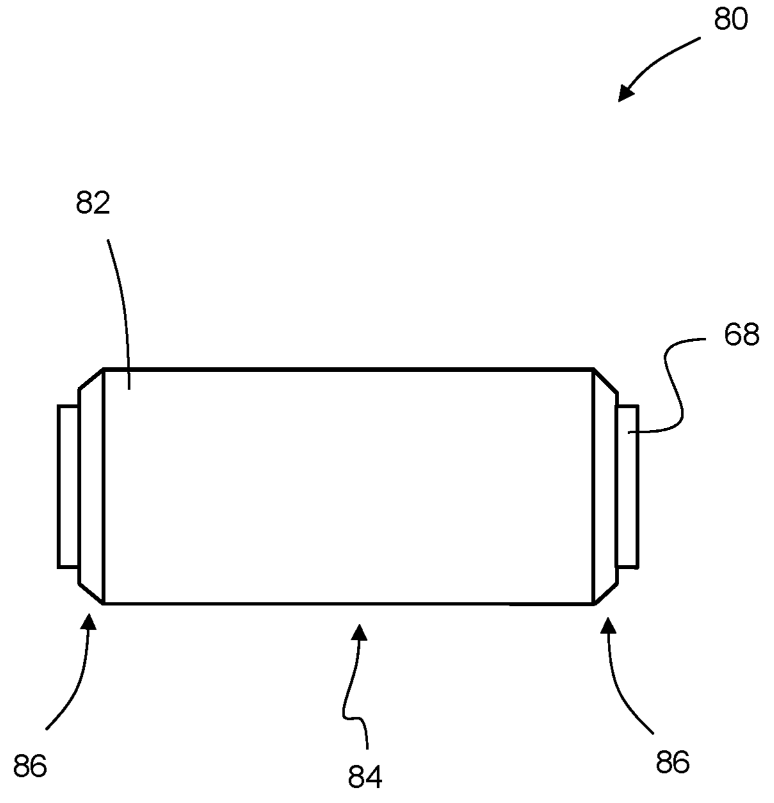
FIG. 3 is a side view of a stretch film roll fabricated using the apparatus of FIG. 1.

A stretch film roll fabricated by the apparatus 20 is shown in FIG. 3, and is generally indicated by reference numeral 80. Stretch film roll 80 comprises a body 82 of stretch film wound onto core 68. The body 82 of stretch film has a generally cylindrical central portion 84 and tapered end portions 86, with the end portions 86 being generally softer than the central portion 84. The configuration of the stretch film roll 80, and in particular the softness and the tapered shape of the end portions 86, results from the oscillation of the cutting blades 32 and 36 during winding onto the core 68. As will be understood, this oscillation causes the formation of longitudinal edges 70 that are generally non-linear, which prevents direct overlap of the longitudinal edges 70 during winding, and thereby eliminates the formation of hard, right-angled corners within the wound film at ends of the roll that would otherwise form in absence of oscillation. As will be appreciated, the softness and the tapered shape of the end portions 86 advantageously increases the tolerance of the stretch film roll 80 to handling errors, such as dropping, which in turn renders the stretch film within the stretch film roll 80 less prone to tearing during use.

Additionally, and as will be appreciated, oscillating the first plurality of cutting blades 32 separately from the second plurality of cutting blades 36 advantageously provides greater control of the final shape of the stretch film roll, which permits greater manufacturing flexibility as compared to what might otherwise be possible by oscillating all of the cutting blades in unison in the same direction and over the same distance. For example, oscillating the first plurality of cutting blades 32 separately from the second plurality of cutting blades 36 advantageously permits the first plurality of cutting blades 32 to be oscillated in a different manner (e.g. over a different distance, and/or at a different frequency) than the second plurality of cutting blades 36, for allowing the end portions of the stretch film roll to be tailored to desired shapes. For example, although in the example shown in FIG. 3, the shapes of the end portions 86 are the same and the stretch film roll 40 has a symmetric shape, the first and second pluralities of cutting blades 32 and 36 may alternatively be oscillated such that the shape of each end portion is different from the other and such that the resulting stretch film roll has an asymmetric shape. As another example, oscillating the first plurality of cutting blades 32 separately from the second plurality of cutting blades 36 advantageously permits the oscillation of only one plurality of cutting blades to be adjusted, as desired, as the diameter of the stretch film roll increases during winding.

Other configurations of the apparatus are possible. For example, although in the embodiment described above, each of the first and second linear oscillating devices is a servo-motor or an electric motor, in other embodiments, one or both of the first and second linear oscillating devices may alternatively be a conventional electric motor configured to drive an eccentric cam for generating the oscillation.

Although in the embodiment described above, both pluralities of cutting blades are oscillated along a common oscillation axis, in other embodiments, the oscillation axis of the first plurality of cutting blades may alternatively be offset from the oscillation axis of the second plurality of cutting blades such that the oscillation axes do not coincide. In one such embodiment, the non-coincident oscillation axes may be offset in the direction of travel of the stretch film web.

In other embodiments, the cutting blades may alternatively be coupled to the linear oscillating devices in a different manner than that of the embodiment described above. For example, although in the embodiment described above, each cutting blade is mechanically coupled to its respective linear oscillating device via the linkage arm connected to the respective push rod, in other embodiments, some or all of the cutting blades may alternatively be mounted on the push rod directly, such as via a mounting bracket, without any linkage arm. Those skilled in the art will appreciate that still other configurations may be used for coupling the cutting blades to the linear oscillating devices.

Although in the embodiment described above, the first and second linear oscillating devices are configured to oscillate the first and second pluralities of cutting blades, respectively, such that each of the first and second pluralities of cutting blades is oscillated at the same fixed frequency and over the same fixed distance along the oscillation axis, in other embodiments, the first and second pluralities of cutting blades may alternatively be oscillated at different frequencies, and/or over different distances along the oscillation axis.

Although in the embodiment described above, each of the first and second pluralities of cutting blades is oscillated at a fixed frequency, in other embodiments, one or both of the first and second pluralities of cutting blades may alternatively be oscillated at a variable frequency, such as a periodically variable frequency or a random frequency, for example.

Although in the embodiment described above, each of the first and second pluralities of cutting blades is oscillated over a fixed distance along the oscillation axis, in other embodiments, one or both of the first and second pluralities of cutting blades may alternatively be oscillated over a variable distance along the oscillation axis, such as a periodically variable distance or a random distance, for example.

Although in the embodiment described above, the fixed frequency is a frequency in the range from 0 cycles per minute to about 200 cycles per minute, in other embodiments, the fixed frequency may alternatively be a frequency that is greater than 200 cycles per minute.

Although in the embodiment described above, the fixed distance is a distance in the range from 0 inches to about 4 inches, in other embodiments, the fixed distance may alternatively be a distance that is greater than 4 inches.

Although in the embodiment described above, the oscillation axis of each of the pluralities of cutting blades is generally orthogonal to the direction of travel of the stretch film web, in other embodiments, the oscillation axis of one or both pluralities of cutting blades may alternatively be non-orthogonal to the direction of travel of the stretch film web, provided that each stretch film web section has longitudinal edges defined by cutting lines that are generally non-linear along the length of the stretch film web section.

In the embodiment described above, the first and second linear oscillating devices are configured to oscillate the first and second pluralities of cutting blades, respectively, such that the cutting blades cut the moving stretch film web into a plurality of stretch film web sections, with each section having a variable width. As will be understood, operating the first and second linear oscillating devices in this manner results in "asymmetric" oscillation of the first and second pluralities of cutting blades. In other embodiments, the first and second linear oscillating devices may alternatively be configured to oscillate the first and second pluralities of cutting blades, respectively, such that the cutting blades cut the moving stretch film web into a plurality of stretch film web sections, with each section having a constant width and having longitudinal edges defined by cutting lines that are generally non-linear along the length of the stretch film web. As will be understood, operating the first and second linear oscillating devices in such a manner would result in "symmetric" oscillation of the first and second pluralities of cutting blades.

Figure 4:
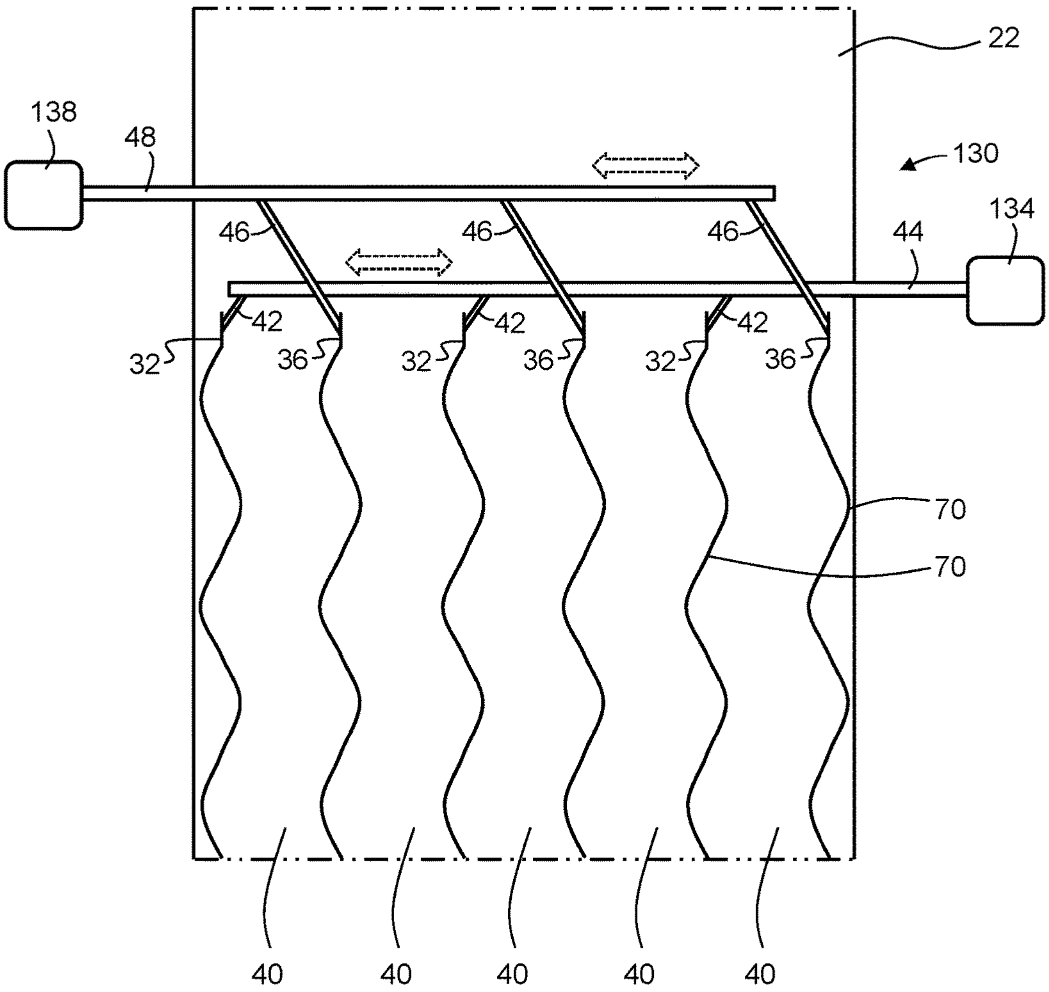
FIG. 4 is a schematic front view of another embodiment of a cutting station forming part of the apparatus of FIG. 1, during use.

For example, FIG. 4 shows another embodiment of a cutting station forming part of apparatus 20, and which is generally indicated by reference numeral 130. Cutting station 130 is generally similar to cutting station 30 described above, and comprises the first plurality of cutting blades 32 coupled to a first linear oscillating device 134, and the second plurality of cutting blades 36 coupled to a second linear oscillating device 138. The first linear oscillating device 134 is configured to oscillate the first plurality of cutting blades 32 along an oscillation axis that is generally orthogonal to the direction of travel of the stretch film web 22. Similarly, the second linear oscillating device 138 is configured to oscillate the second plurality of cutting blades 36 along an oscillation axis that is generally orthogonal to the direction of travel of the stretch film web 22. In turn, the cutting blades 32 and 36 are configured to be oscillated in a "symmetric" manner so as to cut, or "slit", the moving stretch film web 22 into a plurality of stretch film web sections 40, with each section 40 having a constant width. In the embodiment shown, both pluralities of cutting blades 32 and 36 are oscillated along a common oscillation axis 41. More specifically, in this embodiment, the first and second linear oscillating devices 134 and 138 are configured to oscillate the first and second pluralities of cutting blades 32 and 36, respectively, such that each of the first and second pluralities of cutting blades 32 and 36 is oscillated at the same fixed frequency and over the same fixed distance along the oscillation axis in a symmetric, synchronous manner.

Although in the embodiment described above, the first intermediate roller and the second intermediate roller are configured as idler rollers, in other embodiments, one (1) or both of the first intermediate roller and the second intermediate roller may alternatively be configured as a driven roller.

Although in the embodiment described above, the apparatus comprises a first intermediate roller and a second intermediate roller, in other embodiments, the apparatus may alternatively comprise fewer or more intermediate rollers. In one embodiment, the apparatus may alternatively comprise no intermediate rollers.

Although in the embodiment described above, the cutting station comprises a plurality of cutting blades that are configured to cut the stretch film web into a plurality of stretch film web sections, in other embodiments, the cutting station may alternatively comprise two (2) cutting blades that are configured to cut the stretch film web into one (1) stretch film web section, with each cutting blade being oscillated independently of the other in the manner described above.

Although in the embodiment described above, the winding shaft supports a plurality of cores, in other embodiments, the winding shaft may alternatively support one (1) core.

Although in the embodiment described above, the roller adjacent the winding shaft is configured as an idler roller, in other embodiments, the roller adjacent the winding shaft may alternatively be configured as a driven roller. In one such embodiment, the surface speed of the driven roller may be matched to the surface speed of the wound film on the winding shaft using automated or computer-controlled speed matching. In another such embodiment, there may be no assembly provided for rotatably driving the winding shaft, and the winding shaft may alternatively be driven through contact with the surface of the driven roller.

Although in the embodiment described above, the surface of the stretch film wound onto the cores is in contact with the surface of the roller adjacent the winding shaft so as to prevent entrapment of air between layers of the stretch film during winding, in other embodiments, the winding shaft and any roller adjacent thereto may alternatively be configured to enable entrapment of air between layers of the stretch film during winding.

Still other apparatus configurations are possible. For example, although in the embodiment described above, the apparatus comprises an extruder and a rotating cast roller for forming the stretch film web, in other embodiments, the apparatus may alternatively not comprise an extruder and a cast roller for forming the stretch film web, but may alternatively comprise a supply (e.g. a spool, a roll, etc.) of previously-fabricated stretch film web, and provisions for feeding the stretch film web from the supply to the set of rollers, or from the supply to the cutting station if no set of rollers is provided. It will be understood that such a configuration would provide an "off-line" or "secondary" apparatus for fabricating the stretch film roll. Those skilled in the art will recognize that such previously-fabricated stretch film webs may otherwise typically be used for other "off-line" or "secondary" processes such as, for example, one or more of: conventional rewinding, slitting, pre-stretching, and edge folding/rolling.

Although embodiments have been described above with reference to the accompanying drawings, those of skill in the art will appreciate that variations and modifications may be made without departing from the scope thereof as defined by the appended claims.

What is claimed is:

1. A stretch film roll, comprising:
- a wound stretch film web section having longitudinal edges that are non-linear, the stretch film roll comprising:
  - a cylindrical central portion; and
  - tapered end portions,
- wherein the non-linear longitudinal edges comprise:
  - a first longitudinal edge formed by a first cutting blade that is oscillated; and
  - a second longitudinal edge formed by a second cutting blade that is oscillated.

2. The stretch film roll of claim 1, wherein the stretch film web section has a variable width.

3. The stretch film roll of claim 1, wherein the stretch film web section has a constant width.

4. The stretch film roll of claim 1, wherein the second cutting blade is oscillated independently of the first cutting blade.

5. The stretch film roll of claim 1, wherein each of the cutting blades is oscillated along an axis that is generally orthogonal to a direction of travel of the stretch film web section during cutting.

6. The stretch film roll of claim 1, wherein the first and second cutting blades are oscillated along the same axis.

7. The stretch film roll of claim 4, wherein the first cutting blade is oscillated in an asymmetric manner relative to the second cutting blade.

8. The stretch film roll of claim 1, wherein at least one of the first cutting blade and the second cutting blade is oscillated over a fixed distance.

9. The stretch film roll of claim 1, wherein at least one of the first cutting blade and the second cutting blade is oscillated over a variable distance.

10. The stretch film roll of claim 1, wherein at least one of the first cutting blade and the second cutting blade is oscillated at a fixed frequency.

11. The stretch film roll of claim 1, wherein at least one of the first cutting blade and the second cutting blade is oscillated at a variable frequency.

* * * * *